United States Patent [19]

Mohn

[11] Patent Number: 5,259,975
[45] Date of Patent: Nov. 9, 1993

[54] METHOD FOR STABILIZING METALS IN WASTEWATER SLUDGE

[75] Inventor: Michael F. Mohn, Levittown, Pa.

[73] Assignee: Betz Laboratories, Inc., Trevose, Pa.

[21] Appl. No.: 854,502

[22] Filed: Mar. 19, 1992

[51] Int. Cl.⁵ .............................................. C02F 11/00
[52] U.S. Cl. ................................. 210/710; 210/751; 210/912; 405/129; 588/252
[58] Field of Search ............... 210/710, 749, 912, 751, 210/729; 588/252; 405/129

[56] References Cited

U.S. PATENT DOCUMENTS

| | | | |
|---|---|---|---|
| 4,264,436 | 4/1981 | Shim | 208/180 |
| 4,612,125 | 9/1986 | Elfine | 210/724 |
| 4,698,162 | 10/1987 | Guilbault et al. | 210/710 |
| 4,744,950 | 5/1988 | Hollander | 422/16 |

*Primary Examiner*—Neil M. McCarthy
*Attorney, Agent, or Firm*—Alexander D. Ricci; Gregory M. Hill

[57] ABSTRACT

A method for treating the sludge from industrial wastewater streams which contain soluble metals by adding to the sludge an effective amount of a metal complexing agent sufficient to inhibit leaching of the metal from the sludge solids into the environment. The metal complexing agent comprises tolyltriazole.

1 Claim, No Drawings

5,259,975

METHOD FOR STABILIZING METALS IN WASTEWATER SLUDGE

FIELD OF THE INVENTION

The present invention relates to the treatment of sludge produced from wastewater streams. Specifically, it deals with the stabilization of the precipitated metals found in the wastewater sludge.

BACKGROUND OF THE INVENTION

Metal-bearing wastewaters produced in industry have traditionally been treated by the addition of lime (calcium hydroxide) or caustic (sodium hydroxide) to precipitate metal hydroxide solids out of solution. The resulting solids are then separated from the clear water by settling or flotation. Typically, polymer treatments are added to the waste treatment system to aid in flocculating and agglomerating the solids for easier removal and less carryover in the effluent. The agglomerated solids are then collected as sludge, which is often disposed of by landfilling. Large amounts of these sludges are produced daily as a waste product from many different types of manufacturing processes involving metal fabrication, plating, finishing, etc.

However, as a result of the enactment of the Resource Conservation Recovery Act (RCRA), disposal of certain solid wastes recently became subject to the EPA Toxicity Characteristic Leaching Procedure (TCLP) test (Test Method 1311, Federal Register, Mar. 29, 1990 revised Jun. 29, 1990 herein incorporated by reference). Sludges produced from treatments in commercial metals-removal applications are classified as solid wastes and are thus subject to this test, which serves as one of the criteria for distinguishing between hazardous and non-hazardous wastes.

This test requires acidification of the sample, followed by instrumental analysis to measure the concentrations of any metallic ion(s) that may have been leached from the sample. Metal hydroxide-based sludges possess an inherent disadvantage with respect to this test method, since metal hydroxides exhibit resolubilization behavior under suboptimal pH conditions, including those of the TCLP test protocol.

Other treatments for metals removal also produce solid metal-containing precipitates. Precipitation of metal sulfides via addition of a soluble sulfide source (for example, sodium sulfide) is an effective technique for soluble metals removal. However, this process has a disadvantage in that the precipitated metal sulfide solids contained in the resulting sludge are easily oxidized to metal sulfates, and are then resolubilized, since many metal sulfate salts are water soluble.

The use of sodium borohydride to chemically reduce soluble metals to their elemental forms has also been used. This process produces very low volumes of sludge solids consisting of solid elemental metals. However, these metal solids will easily redissolve (i.e., corrode) if left in contact with an aqueous system.

Thus, each of the metal-based sludges generated from the techniques described above are likely to be relatively unstable under conditions similar to those of the TCLP test.

RELEVANT ART

Much of the art within the broad field of wastewater treatment focuses on treating the wastewater stream to remove the metals contained in the effluent. Known metal treating agents, such as alkali metal trithiocarbonates and alkyl thiocarbamates, are added to the wastewater stream in order to complex with both water soluble and suspended insoluble metals. This complex either forms a precipitate and can be flocculated and agglomerated by further treatment.

U.S. Pat. No. 4,612,125, discloses such a method. Sodium trithiocarbonate is added to the metal containing waste-water. The metal-trithiocarbonate complex is then filtered out of the effluent, leaving a sludge cake relatively free of soluble trace metals.

U.S. Pat. No. 4,264,436 discloses the use of a triazole compound to remove soluble metal salts from turbine/circulating oils. Metals specifically treated are copper, iron and lead. The resulting sediment is then filtered or otherwise removed from the oil.

Triazoles, such as the alkyl substituted benzotriazole disclosed in U.S. Pat. No. 4,744,950, are well known as corrosion inhibitors for copper bearing metallurgies. This patent teaches the utility of these compounds in aqueous cooling systems.

DETAILED DESCRIPTION OF THE INVENTION

The present invention comprises the addition of a metal complexing agent to the sludge extracted from the wastewater stream of various industrial processes. The metal complexing agents of the invention is tolyltriazole (TTA).

The effluent wastewater stream is traditionally treated in a clarifier with either caustic (NAOH) or lime (Ca(OH)$_2$). The amount of caustic or lime added to the wastewater stream will vary depending upon the initial, pretreatment pH of the water. The objective, though, is to raise the pH to a value corresponding to the minimum solubility of the resulting hydroxide solids generated from the chemical precipitation reaction of the metal ion(s) and free hydroxyl ion. The desired pH is typically around 9.

Once in the clarifier, the lime or caustic will complex with the soluble metals contained in the effluent wastewater to form metal hydroxides. These metal hydroxides will then precipitate out of solution and drop to the bottom of the clarifier. This precipitate is periodically drawn off from the bottom of the clarifier to form a sludge. The amount of solids present in the sludge will depend upon numerous variables, such as the amount of soluble metals present in the pretreated wastewater and the frequency of sludge removal. Many metal bearing sludges will contain up to about 30% by weight solids, with most of them having about 20% by weight or less. The sludge drawn off from the clarifier is then typically transported to a press for dewatering.

The metal complexing agent of the invention may be added directly to the wastewater either after or without caustic addition. If caustic is used, it may also be added directly to the dewatered sludge. The amount of agent added to either the wastewater or sludge is that amount sufficient to stabilize the metals. Stability is defined herein as a reduction in the propensity of the metals, in their hydroxide form, in the dewatered sludge to redissolve and leach into the environment as solubilized metals or ions under the acidic conditions which can be found in the landfill or other places of disposition for the dewatered sludge. Stabilization of these metal hydroxides will permit the sludge to pass the stringent requirements of the TCLP test and satisfy the mandate of the RCRA regarding the disposal of solid wastes that contain metals. The maximum acceptable levels for certain metals, as defined in the Federal Register (Toxicity Characteristic Final Rule, Mar. 29, 1990) are as follows:

| TCLP Maximum Limits for Inorganics | |
|---|---|
| | ppm |
| Arsenic | 5 |
| Barium | 100 |
| Cadmium | 1 |
| Chromium | 5 |
| Lead | 5 |
| Mercury | 0.2 |
| Selenium | 1 |
| Silver | 5 |

In the future, TCLP maximum limits for metals may become even more stringent. Additionally, maximum limits may be defined for more metals not presently listed.

The amount of the metal complexing agent according to the present invention which is added to the wastewater or sludge is in the range of 5 to 50,000 ppm. The most appropriate amount of treatment agent necessary will vary from process to process depending on the amount and type of solids present in the sludge and the preparation of metal hydroxides present in the solid waste. The proper administration level should be determined by running periodic TCLP tests.

EXAMPLES

Example 1

A sample of waste pickle liquor was obtained from a specialty steel mill located in Reading, PA. The pickle liquor contained hydrochloric and sulfuric acids, as well as large amounts of dissolved metals (see Table I, below) and relatively small amounts of alkaline cleaner waste.

This steel mill currently treats this waste pickle liquor by adjustments with lime to a pH of 9, followed by addition of an acrylamide/acrylic acid anionic polymer as a settling aid. After solids settling, the mixed metal hydroxide sludge is dewatered using a belt press.

For the purpose of facilitating handling, the waste pickle liquor was diluted tenfold and adjusted to a pH of 9. NAOH and $Ca(OH)_2$ were used as benchmark standards. Other test samples were treated with tolyltriazole. The sludges were then analyzed according to the TCLP protocol. Results are shown in Table II.

TABLE 1

| Analysis of Steel Mill Waste Acid Pickle Liquor (prior to treatment) | |
|---|---|
| Component | Concentration (ppm) |
| Al | 6.8 |
| Sb | 0.34 |
| As | 0.15 |
| Ba | 1.87 |
| Cd | 0.09 |
| Cr | 7.49 |
| Co | 4.7 |
| Cu | 27.0 |
| Fe | 2166 |
| Pb | 1.5 |
| Mn | 19.1 |
| Hg | <0.002 |
| Ni | 210 |
| Se | <0.025 |

TABLE 1-continued

| Analysis of Steel Mill Waste Acid Pickle Liquor (prior to treatment) | |
|---|---|
| Component | Concentration (ppm) |
| Zn | 6.5 |

Note:
This sample was diluted ten-fold and filtered through a 0.45 um filter.

TABLE II

Effect of Chemical Treatments on TCLP Sludge Extract Analyses
Wastewater Substrate: Steel Mill Waste Acid Pickle Liquor

| | Sludge Treatment | | |
|---|---|---|---|
| Element | Sodium Hydroxide | Lime | TTA 50 ppm |
| Al, ppm | 4.70 | 4.75 | <0.30 |
| Sb, ppm | 1.40 | <0.02 | <.15 |
| As, ppm | 0.240 | 0.04000 | <.2 |
| Cd, ppm | <0.00200 | <0.00200 | <.02 |
| Cr, ppm | 131. | 30.4 | 0.05 |
| Co, ppm | 2.10 | 1.70 | <0.03 |
| Cu, ppm | 11.5 | 9.04 | <0.03 |
| Fe, ppm | 813. | 184. | 0.16 |
| Mn, ppm | 8.60 | 10.1 | 1.10 |
| Hg, ppm | 0.00020 | <0.0 | <0.0002 |
| Ni, ppm | 99.0 | 71.5 | <0.09 |
| Se, ppm | <0.02000 | <0.02 | <0.02 |
| Zn, ppm | 1.90 | 0.766 | <0.05 |
| pb, ppm | 0.07 | 0.032 | <0.02 |

Table II shows that the TCLP extracts obtained from the sludge treated with TTA contained lower concentrations of several dissolved metals compared to the sludge samples treated with caustic only. Final concentrations were determined by ICP [Inductively Coupled Plasma].

Example 2

There are instances when a producer of wastewater and wastewater sludge has a problem with high concentrations of specific metals. The following example shows the value of TTA as a sludge stabilizer after treatment with caustic. At a southern manufacturing facility, cooling tower blowdown water was obtained where cadmium levels exceeded NPDES (National Pollutant Discharge Elimination System) standards.

The substrate samples as received from the source contained 0.272 ppm of cadmium. This is in excess of the NPDES limit of 0.05 ppm.

The samples were first treated with sodium hydroxide to adjust pH to approximately 9. 100 ppm of TTA was added to the substrate along with 7.5 ml of an acrylic acid/acrylamide copolymer as a flocculant. Results are shown in Table III.

TABLE III

| Cadmium Stabilization Using TTA | | |
|---|---|---|
| Treatment | Amount (ppm) | Cd (ppm) |
| Control (caustic only to pH 9) | | 0.116 |
| Flocculant polymer | 7.5 | 0.121 |
| TTA + Flocculant | 100 7.5 | 0.06 |

Example 3

A southeast copper recycling company was experiencing unacceptable levels of nickel in their wastewater effluent and subsequent sludge. The untreated effluent contained 2.79 ppm of nickel. The conventional treatment used by this facility is as follows:

1) 50 ppm Al$_2$(SO$_4$)$_3$·13 H$_2$O as a coagulant
2) pH adjust to 4.0 with H$_3$PO$_4$ to free up chelated metals
3) 5 ppm poly (diallyldimethyl ammonium chloride)
4) pH adjust to 8.3 with NAOH to precipitate the metal hydroxides Table IV shows the beneficial effects of adding various amounts of TTA to samples of the substrate already treated as shown above.

TABLE IV

| Treatment | Nickel Stabilization Using TTA | |
|---|---|---|
| | Amount (ppm) | Ni (ppm) |
| Control | (as shown above) | 0.82 |
| TTA | 5 | 0.60 |
| TTA | 10 | 0.47 |
| TTA | 25 | 0.18 |
| TTA | 50 | 0.04 |

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What I claim is:

1. A method for treating wastewater sludge separated from metal-bearing wastewaters produced from commercial metals-removal applications which sludge contains metal hydroxide precipitates comprising adding to the sludge from 5 to 5,000 ppm of tolyltriazole to complex with and stabilize the metal hydroxide precipitates in said sludge thereby reducing the propensity of said metal hydroxide precipitates to redissolve and leach into a sludge disposal environment under acidic leaching conditions found in said sludge disposal environment.

* * * * *